No. 12,221. REISSUED MAY 24, 1904.

A. G. COUCH.

HORSE COLLAR.

APPLICATION FILED MAY 14, 1902.

2 SHEETS—SHEET 1.

Witnesses

J. G. Hinkel

Wm. Gillman, Jr.

Inventor

Andrew G. Couch

By Foster Freeman

Attorneys

No. 12,221. REISSUED MAY 24, 1904.
A. G. COUCH.
HORSE COLLAR.
APPLICATION FILED MAY 14, 1902.
2 SHEETS—SHEET 2.
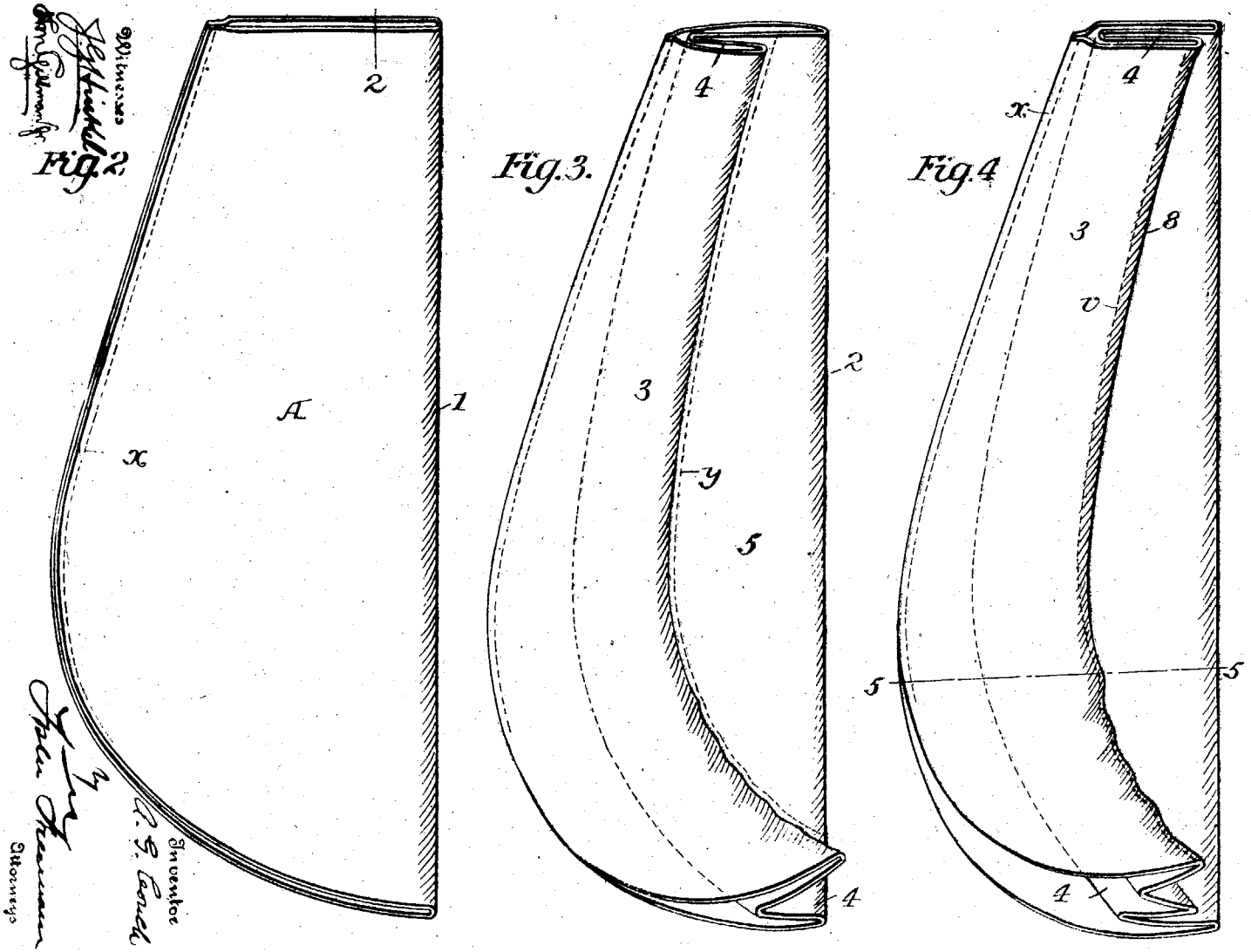

No. 12,221. Reissued May 24, 1904.

UNITED STATES PATENT OFFICE.

ANDREW GEORGE COUCH, OF EASTPOINT, GEORGIA, ASSIGNOR TO THE COUCH BROTHERS & J. J. EAGAN COMPANY, OF EASTPOINT, GEORGIA, A CORPORATION OF GEORGIA.

HORSE-COLLAR.

SPECIFICATION forming part of Reissued Letters Patent No. 12,221, dated May 24, 1904.

Original No. 672,976, dated April 30, 1901. Application for reissue filed May 14, 1902. Serial No. 107,373.

*To all whom it may concern:*

Be it known that I, ANDREW GEORGE COUCH, a citizen of the United States, residing at Eastpoint, in the county of Fulton and State of Georgia, have invented certain new and useful Improvements in Horse-Collars, of which the following is a specification.

My invention relates to the manufacture of horse-collars, and especially to the character of casings and the mode of making the same from a single strip of material without cutting or gores and of the desired curved form, as fully set forth hereinafter, and as illustrated in the accompanying drawings, in which—

Figure 1:
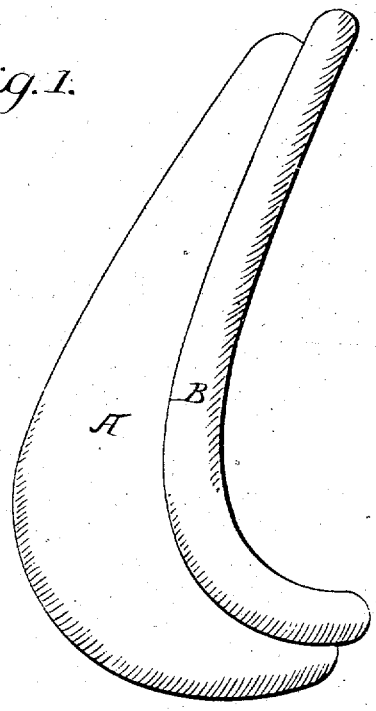
Figure 5:
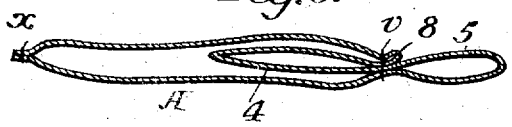
Figure 6:
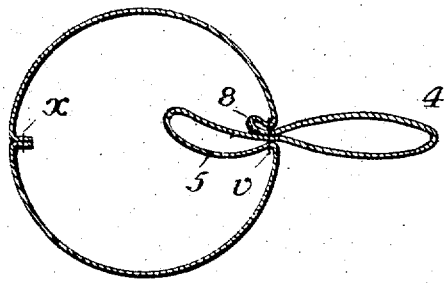
Figure 7:
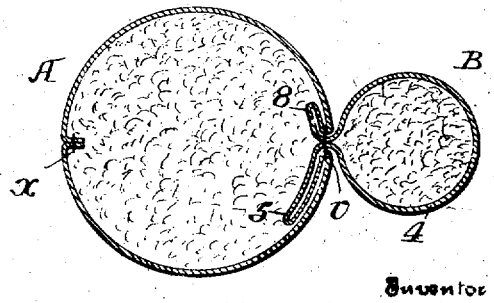

Figure 1 is a perspective view showing one section of a horse-collar made from my improved casing. Fig. 2 is a view showing the manner in which a single strip is folded, formed, and united at the edges in the manufacture of the casing. Fig. 3 is a view showing the following step or process of manufacture. Fig. 4 is a view illustrating the position of the parts after the outer folds and other portions of the strip have been sewed by a seam passing through the edge of the outer fold. Fig. 5 is a section on the line 5 5, Fig. 4, before the casing has been turned. Fig. 6 is a section showing the position of the parts after the casing has been turned inside out. Fig. 7 is a view in section of the parts after being stuffed.

The two casings A of the collar are alike, and each consists of a single piece of fabric folded upon itself so as to form the straight folded edge 1 and rounded near one end and contracted toward the other, as shown. The overlying edges of this piece are sewed together along the line $x$, extending from the contracted end to and partly along the rounded end, as shown in Fig. 2. The upper portion of the strip thus folded and sewed is then drawn toward the stitching $x$, so as to carry the line of fold from the line 1, Fig. 2, to the position of the line 2, Fig. 2, thus forming a fold 3 of the surplus material, and the strip is then basted along the line $y$, Fig. 3, and the fold 3 is laid with its edge upon this basted line, and a line of stitches $v$ is then run through the fold 3 adjacent to the edge thereof, but so as to leave a flap or free portion 8, and through the underlying parts of the material, following the basted line $y$, and the material included between the line of stitches $v$ and the straight edge 2 will form a dart or infold 5. By thus forming the fold 3 and stitching it along the line $y$, as described, there is also formed a fold 4 of substantially uniform width, the line of stitching $v$ being parallel to the edge of the fold 4 and passing through the fold 3 near the edge and through the material beneath, as shown in Fig. 5. As the lower portion of the strip is curved and as it is desired to impart a like curve to the fold 4, this result is secured by puckering the fold of the edge 3, as indicated in Figs. 3 and 4. After these operations the bag or casing thus formed is turned inside out, thus bringing the fold 4 to the outside and carrying to the inside that portion forming a dart or infold 5, and the seam $x$ is also carried inside of the casing, as shown in Fig. 6. By this means a casing is formed, consisting of two parts A B, the part A being the largest, contracted at each end, and greatest in diameter at a point above the lower end, while the part B is of substantially uniform diameter. These two parts are now suitably stuffed with hair, moss, or other suitable material, so as to form two connected wales or cushions, the wale or cushion B being cylindrical and of substantially uniform diameter and the wale or cushion A being largest near the lower end, but contracted at both ends, as required in a section of the horse-collar.

In the act of stuffing the part A of the casing the dart or infolded portion 5 will be forced down against the inner side of the outer portion of the casing and will thus present a greater thickness at the point in the collar which the hames bear upon, so that if the outer part of the casing should wear away the integrity of the casing is still retained and the packing is not exposed. The flap 8 will also be forced down against the inner surface of the cushion or wale A and with the dart or infolded portion 5 will form overlying parts to protect the surface loops of the stitching *v*, so that there will be no liability of injuring the stitching by the packing-rod or rammer used in stuffing the wales or cushions.

It will be seen that by the method of manufacture above set forth the casing is made of a single piece of fabric, not only avoiding the waste which comes from cutting the separate sections of different shape and the necessity of sewing them together, but also avoiding the weakness resulting from seams, injury from ripping, and insuring much greater durability.

The puckering of the fold 3 is an important feature in connection with this mode of manufacture, as by this means it is possible to impart any desired contour to the cushion-piece A, and yet preserve the uniform diameter of the bearing-roll B, and gives to the latter the desired curve and set, so that it is maintained in a position to prevent the hames from leaving the collar in backing or in holding back in going down hills.

Two casings of reverse curvatures stuffed as above described may be connected together either at the bottom or the top.

The strip from which the casing is made may be of canvas or any other suitable material, and the casing may be protected from wear by overlays of leather, as required, at any desired points.

While I have referred to the line of basting *y* and while this serves to retain the parts of the strip in position after drawing up the fold 3, it is not absolutely necessary to use the same, and the proper line upon which to lay and sew the fold 3 may be indicated by pencil-line.

Without limiting myself to the precise steps or form and arrangement shown and described, I claim as my invention—

1. A casing for a section of a horse-collar consisting of a single strip of material folded upon itself and inturned and united at the edges, divided by a curved line of stitching *v* into two unequal parts A, B, the part A of varying width, the material being puckered adjacent to the lower portion of the line *v* and to the widest portion of the part A, to impart a curved form to the casing when stuffed, substantially as set forth.

2. A casing for a section of a horse-collar consisting of a single strip of material folded upon itself and united by stitching at the edges along the line *x*, and at *v*, forming a larger portion A tapering toward the ends and a smaller cylindrical portion, and having an infolded portion within the portion A, the line of stitching at *v*, passing through the base of the infold and through the adjacent portions of the casing, substantially as set forth.

3. A horse-collar provided with casings each consisting of a single strip of material folded upon itself and united at the edges and having an infold 5 and a securing-seam *v*, the infold 5 lying against that portion of the casing subject to the wear of the hame, substantially as set forth.

4. A section of a horse-collar in which a one-piece or integral blank is united by stitches to form the wales, the stitches in the completed collar being within one of the wales.

5. As an improved article of manufacture, a section of a horse-collar made up from a single one-piece blank which is connected by a line or lines of stitches the stitches being located entirely within one of the wales of the collar-section.

6. A section of a horse-collar made up from a single integral blank which is connected by a line of stitching to provide fore and after wales, the surface loops of the stitches being within one of the wales and protected by overlying parts of the blank, the same being invisible in the made-up collar-section.

7. A section of a horse-collar consisting of a single piece of material which is folded upon itself to provide an inturned portion, the parts being united by a curved line of stitches which connects the blank to provide fore and after wales, the material forming the after wale being shaped and puckered adjacent to its larger portion to impart a curved form to such wale when stuffed.

8. The herein-described section of a horse-collar made from a single piece of properly-shaped material or blank which has within its margin a dart, the edges of the material being connected by a line of stitches, one of the wales being turned so that in the completed collar-section the seam will be located within said turned wale.

9. A section of a horse-collar made up from a one-piece or integral blank which is folded so that the part which subsequently forms the fore wale will be within the part which forms the after wale, a line of stitches which pass through the folded blank to connect the edges of the blank and form the wales, one of the wales being turned inside out prior to being filled.

In testimony whereof I have signed my name, in the presence of two subscribing witnesses.

ANDREW GEORGE COUCH.

Witnesses:

W. D. DUPREE,

J. B. RAVEN.